United States Patent [19]

Yogeshwar et al.

[11] Patent Number: 5,767,797
[45] Date of Patent: Jun. 16, 1998

[54] HIGH DEFINITION VIDEO DECODING USING MULTIPLE PARTITION DECODERS

[75] Inventors: Jay Yogeshwar, Lawrenceville, N.J.; Robert Rozploch, Newtown, Pa.; Mikhail Tsinberg, Riverdall, N.Y.

[73] Assignee: Kabushiki Kaisha Toshiba, Kawasaki, Japan

[21] Appl. No.: 665,548

[22] Filed: Jun. 18, 1996

[51] Int. Cl.$^6$ ...................................................... H03M 7/00
[52] U.S. Cl. .............................. 341/50; 341/67; 348/426; 348/469
[58] Field of Search .................... 341/67, 50; 348/426, 348/469

[56] References Cited

U.S. PATENT DOCUMENTS

| | | | |
|---|---|---|---|
| 5,357,282 | 10/1994 | Lee | 348/403 |
| 5,502,493 | 3/1996 | Meyer | 348/426 |
| 5,504,823 | 4/1996 | Yoon | 382/233 |
| 5,510,842 | 4/1996 | Phillips et al. | 348/426 |
| 5,532,744 | 7/1996 | Akiwumi-Assani et al. | 348/390 |
| 5,640,210 | 6/1997 | Knee et al. | 348/469 |

FOREIGN PATENT DOCUMENTS 3-85922  4/1991  Japan .

OTHER PUBLICATIONS

Lee et al., "Implementation of Digital HDTV Video Decoder By Multiple Multimedia Video Processors," IEEE 1996, pp. 98–99.

Cugnini et al., "MPEG–2 Video Decoder for the Digital HDTV Grand Alliance System," IEEE Transaations on Consumer Electronics, 1995, pp. 748–753.

Boyce et al., "An SDTV Decoder with HDTV Capability: An All-Format ATV Decoder," Hitachi America, Ltd. paper, pp. 1–12.

Selected papers from the SMPTE Advanced Television and Electronic Imaging Conference, San Francisco, CA. on Feb. 10–11, 1995, "New Foundations for Video Technology," pp. 195–209.

*Primary Examiner*—Jeffrey A. Gaffin
*Assistant Examiner*—Jason L. W. Kost
*Attorney, Agent, or Firm*—Finnegan, Henderson, Farabow, Garrett & Dunner, L.L.P.

[57] ABSTRACT

A partition decoder system for high definition video decoding receives an HD picture divided into a selected number of sections, each section including identification data including a start code. An FLD detects each start code and assigns a pointer. A selected number of partition decoders, corresponding to the selected number of sections, uses the pointers to select and decode a selected section of the HD picture. The selection is made according to a selected memory management scheme.

14 Claims, 2 Drawing Sheets

HIGH DEFINITION VIDEO DECODING USING MULTIPLE PARTITION DECODERS

BACKGROUND OF THE INVENTION

1. Field of the Invention

The present invention relates to high definition video decoding. More specifically, the present invention relates to a partition decoder system for high definition video decoding, using a selected number of partition decoders.

2. Description of the Related Art

The United States Advanced Television Systems Committee has chosen a Digital Television Standard for the transmission of High Definition Television ("HDTV"). Although, this committee started out with the idea of standardizing HDTV alone, the flexibility offered by a digital transport mechanism has transformed this standard into one of transmitting either Standard Definition ("SD") or High Definition ("HD") Television. Since a decoder designed for decoding only high definition coded pictures would serve only a limited purpose, new equipment should be capable of decoding and presenting multiple standard definition pictures, or a single high definition picture.

There are several design complexities associated with a single decoder for high definition video decoding. Higher resolution dictates that an HD signal must carry significantly more information than an SD signal. Yet each HD frame must be processed as quickly as an SD frame. Thus, HDTV requires a larger memory bandwidth and very high speed variable length decoders ("VLD's"). Typically, the decoder requires access to the entire picture in order to compute the proper prediction. This access has to be at very high speed in order for one HD picture to be processed in one frame interval. The real time constraint of processing one picture worth of data in one frame interval is just as applicable to HD as it is to SD. This implies that one macroblock of HD data needs to be processed in one quarter or less time than the corresponding SD data.

In view of the problems mentioned above, attempts have been made to partition the HD picture into smaller tiles, and process them in parallel. A decoder of a lesser complexity would conceivably process one of these smaller tiles within one frame interval. However, this is not a simple procedure, as there exists no similar partitioning of the picture at the encoder. The partitioned encoder is not the standard. The entire picture is encoded as a unit. A benefit of this is that it does not impose any particular partitioning structure on the decoder. On the other hand, it is not clear if the decoding could be accomplished in a partitioned manner at all.

SUMMARY OF THE INVENTION

Accordingly, the present invention is intended to exploit an understanding of video syntax and semantics in order to implement a partitioned HD video decoder. The same decoder may be used to decode multiple SD video data. In addition, the present invention is intended to overcome problems associated with such an implementation in an optimal manner.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

In accordance with the invention, and as broadly described herein, a partition decoder system for high definition video decoding comprises a coded data storage unit for receiving a high definition video picture partitioned into a selected number of sections, each section containing coded HD video data and identification data including a start code. A fixed length decoder is provided for detecting each start code and assigning a pointer to each start code. A selected number of partition decoders are also provided, the selected number of partition decoders corresponding to the selected number of sections. Each partition decoder uses one of the pointers to select a portion of the high definition video data to be decoded.

In another aspect of the invention, the partition decoder system for high definition video decoding comprises means for receiving an HD video picture partitioned into at least first, second, third, and fourth sections, each section containing coded HD video data and identification data. The system further comprises at least first, second, third, and fourth partition decoders. Each partition decoder is assigned to decode one of the sections, with the first partition decoder for receiving coded video data from the first and second sections, the second partition decoder for receiving coded video data from the first, second, and third sections, the third partition decoder for receiving coded video data from the second, third, and fourth sections, and the fourth partition decoder for receiving coded video data from the third and fourth sections.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiments given below, serve to explain the principles of the invention.

DETAILED DESCRIPTION OF THE PREFERRED EMBODIMENTS

Reference will now be made in detail to the present preferred embodiments of the invention as broadly illustrated in the accompanying drawings.

In accordance with the invention, a partition decoder system for high definition video decoding comprises a coded data storage unit for receiving a high definition video picture partitioned into a selected number of sections, each section containing coded high definition video data and identification data including a start code. As broadly embodied herein, and referring to FIG. 1, a high definition video bit stream "C," comprising at least one HD video picture, is input into coded data storage unit 10.

As will be understood by one of ordinary skill in this art, an HD video picture can be divided into a matrix of macroblocks, each macroblock consisting of 16 pixels×16 pixels of data. The matrix of macroblocks define a series of horizontal rows and vertical columns. Each horizontal row of macroblocks can also be referred to as a slice, or a tile. A slice always starts at the start of a macroblock row.

Figure 2:
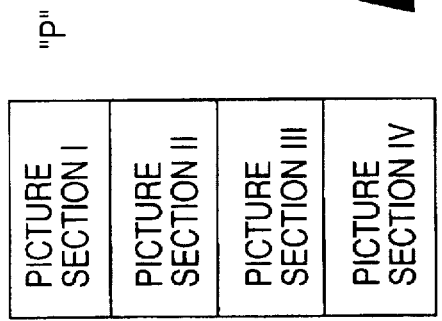
FIG. 2 depicts a coded video picture partitioned into four sections in accordance with the invention.

In accordance with the invention, the slices or tiles further may define a plural number of sections. As broadly embodied herein, the picture is partitioned into at least two sections. Preferably, a finite number of slices defines each separate section. For example, if an HD picture were defined into 30 slices, then it could be further divided into, for example, two sections of fifteen slices, ten sections of three slices, or thirty sections of one slice each. Referring to FIG. 2, HD video picture "P" included in HD bit stream "C," comprises four sections, I, II, III, and IV.

In accordance with the invention, each section includes identification data as well as video data. This identification data includes a slice start code. The slice start code contains a slice vertical assignment, is of fixed length, and therefore is easily identifiable. Preferably, the data in the section after the start code further includes sequence data, GOP data, picture data, and slice layer data.

In accordance with the invention, a fixed length decoder (FLD) is provided for detecting each slice start code, and assigning a pointer to each slice start code. As broadly embodied herein, and referring to FIG. 1, FLD 12 communicates with coded data storage 10. FLD 12 can identify each slice start code easily, hence avoiding the need for any partial VLD in order to recognize the start of a slice.

After the FLD 12 identifies the slice start code, the sequence data, GOP data, picture data, and slice layer data are identified by a variable length decoder (VLD) in each decoder (discussed below). FLD 12 also assigns a "pointer" to each start code. A "pointer" is a marker placed at the byte number at which the slice begins. Assignment of a pointer to each start code is important to minimize buffer requirements for the system, as will be explained in greater detail below.

In accordance with the invention, a selected number of partition decoders are provided, the selected number of partition decoders corresponding to the selected number of sections, each said partition decoder using one of the pointers to select a portion of the high definition video data to be decoded. As broadly embodied herein, and referring to FIG. 1, a plurality of partition decoders 16 are provided, the decoders having local memory.

The number of partition decoders 16 may vary. However, in accordance with the invention, the number of partition decoders corresponds to the number of sections. Hence, where the HD picture is divided into four sections, four partition decoders are used.

Data is assigned to each decoder in accordance with the pointers assigned by FLD 12. The pointers identify what data is relevant to which decoder. This mechanism prevents the need for demultiplexing data by slices, and providing additional storage prior to decoding. The sequence data, GOP data, picture data, and slice layer data is accessible to all of the decoders.

It is further preferable that the system include a decoder configuration unit for keeping track of the pointers and passing the pointers to the selected number of partition decoders. As broadly embodied herein, and referring to FIG. 1, decoder configuration unit 14 is provided between FLD 12 and the multiple partition decoders with local memory 16.

Figure 1:
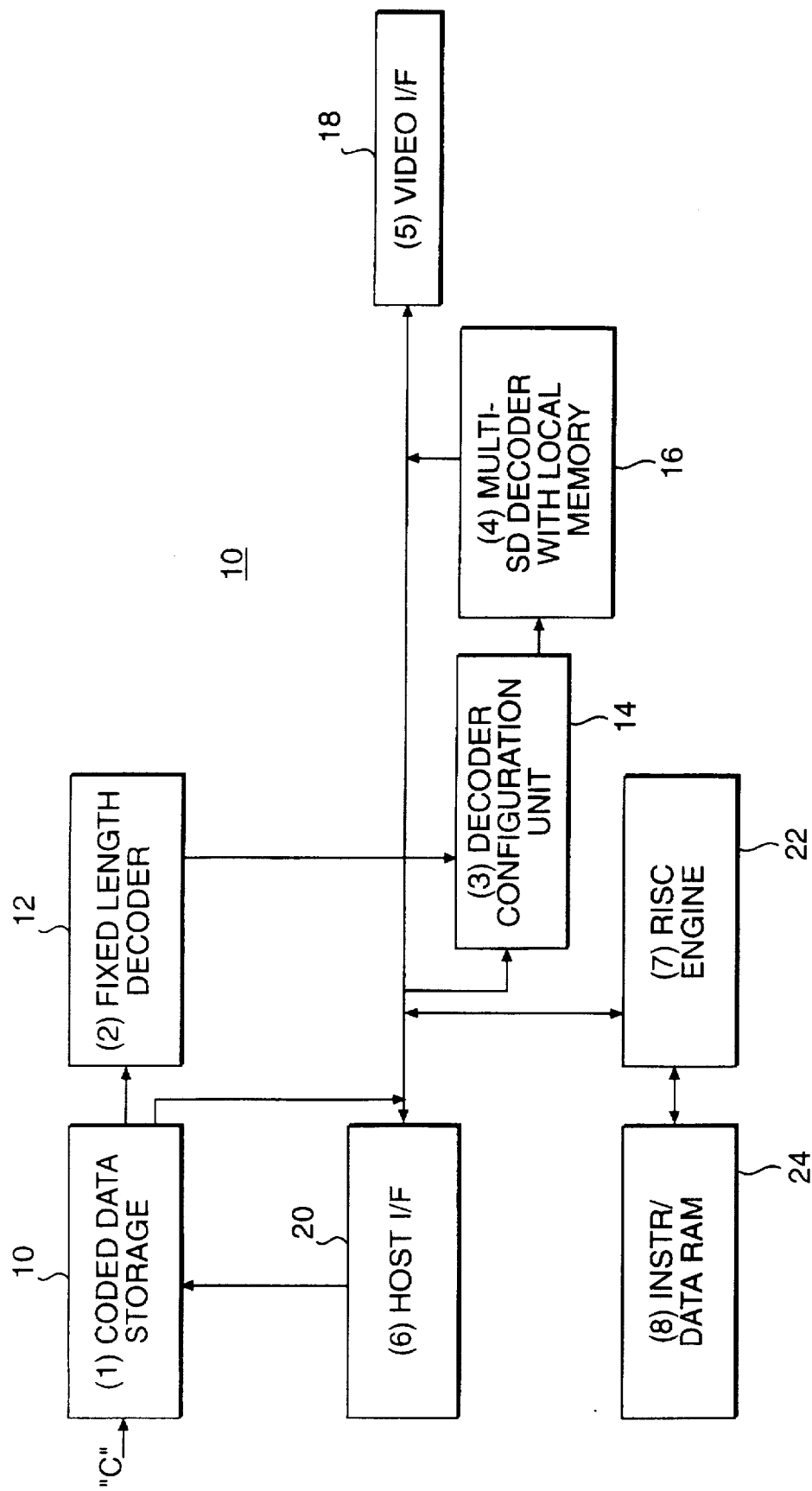
FIG. 1 is a block diagram depicting a partition decoder system in a dance with the present invention.

Operation of the partition decoder system broadly depicted in FIG. 1 will now be described. The serial bit stream enters the coded data storage unit 10. This storage unit has some characteristics of FIFO (the data is always written in bit serial fashion) but has random access. FLD 12 detects slice start codes, and assigns a pointer to each slice start code. This information is passed to decoder configuration unit 14, which keeps track of all slices for tiling purposes, and passes this to the multiple partition decoders with local memory 16. The number of partition decoders corresponds to the number of sections into which an HD picture in the bit stream is partitioned. A video interface 18 takes the decoded video from the partition decoders 16 and outputs it in an appropriate format. A host interface 20 provides communication between a host and the decoder, and also serves as a means of providing compressed data input. A RISC Engine 22 manages decoder resources, and directs the flow of the decoding process via instructions (microcode) received from an Instruction/Data RAM 24.

The invention may also include memory management of the partition decoders. As broadly embodied herein, three types of memory management are within the scope of the invention, and will be discussed below.

Ordinarily, if each decoder were allocated a picture tile to be decoded, and if the memory accessed by each decoder were separate, inter-process communication would be necessary to reconcile the final decoded picture. Further, the decoder tiles need to overlap to the extent that each tile has some unusable sections. The bad or unusable section results from the fact that the prediction data for decoding one tile may only be available in a different tile due to the motion compensation process. The tiles should thus be so overlapped that the sections of the picture are decoded in duplicate. Further this duplication should be such that when the usable portion of all tiles are combined, it results in a complete picture. The disadvantage of this method is that although the memory bandwidth is the same as that for SD, the number of SD decoders required to properly tile the HD picture is very high, and always greater than the ratio of HD to SD picture resolution. This means that the memory requirement is also higher than that required for a HD decoder.

An alternative to overlapped processing is to use increased local memory to store an extended portion of the reference pictures. The extended portion of the picture data is such that it extends above and below the tile being decoded to the maximum extent of motion compensation. As an example, if the maximum possible extent of motion compensation in the vertical direction is 96 pels, then 96 lines of the reference picture above and below the tile being decoded should be made available in the local memory. For the case of the end tiles (top-most and bottom-most part of the picture) the additional memory is required in only one direction. At the end of each picture coding, the memory areas referenced by all the decoders should be updated. Although this method requires only as many decoders as there are SD tiles in HD (ratio of HD to SD picture resolution), it has the disadvantage of higher memory requirement.

Yet another approach is that all the tiled decoders share a common memory, with each decoder capable of accessing a region within that memory. In order to ensure that good prediction data is always accessible, this region has to be greater than the decoded picture tile by the maximum motion vector size in all directions. Although this scheme avoids overlap processing, memory is accessed simultaneously by all decoders. This implies that the memory bandwidth is as high as for the HD case.

The first approach discussed above requires a greater number of decoders, and a larger amount of memory. However, the memory bandwidth is the same as the memory bandwidth for SD. The second approach uses fewer decoders and a smaller memory bandwidth, but a larger amount of memory. The third approach requires fewer decoders and a smaller amount of memory, but has the memory bandwidth of HD.

Of these three approaches, when the art of reduced memory decoding is applied, the second approach becomes the most preferable. Accordingly, another preferred embodiment of the invention will be explained with reference to FIGS. 2 and 3.

In accordance with the invention, a partition decoder system for HD video decoding comprises means for receiving a HD video picture partitioned into a least first, second, third, and fourth sections, each section containing coded HD video data and identification data, and at least first, second, third, and fourth partition decoders, each of the partition decoders being assigned to decode one of the sections, the first partition decoder for receiving coded video data from the first and second sections, the second partition decoder for receiving coded video data from the first, second and third sections, the third partition decoder for receiving coded video data from the second, third and fourth sections, and the fourth partition decoder for receiving coded video data from the third and fourth sections. The partition decoder system further comprises a memory manager for providing the coded video data to the partition decoders.

Figure 3:
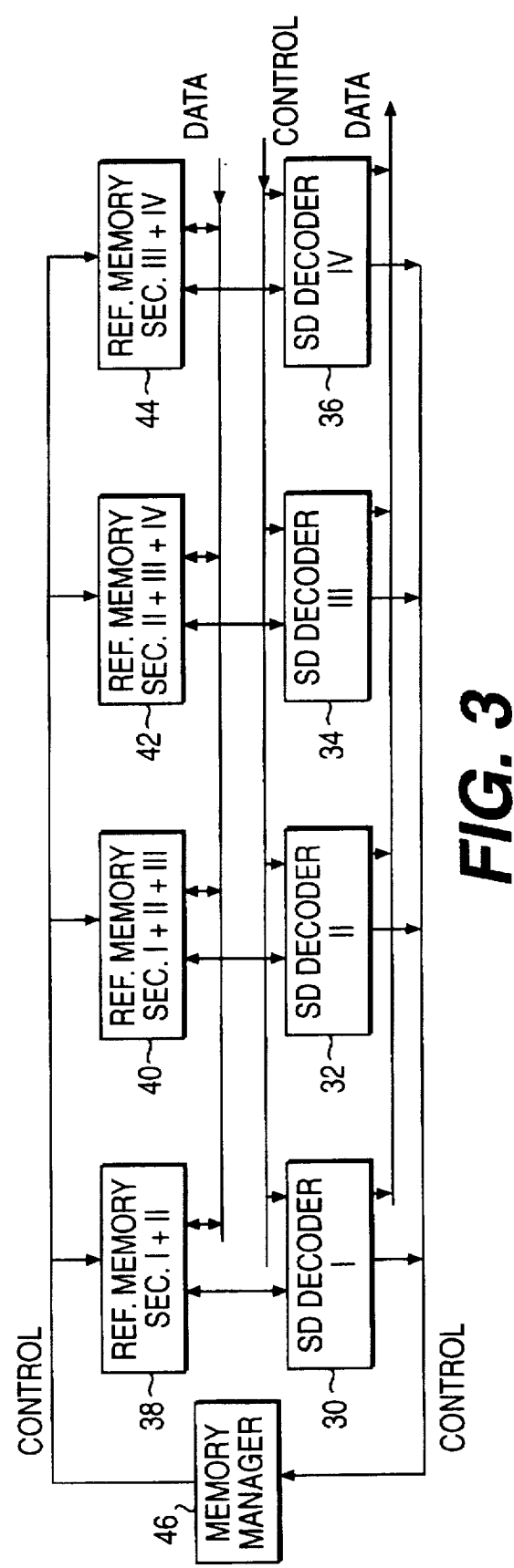
FIG. 3 is a block diagram depicting operation of first through fourth partition decoders in accordance with the present invention.

As broadly embodied in FIG. 3, the multiple partition decoders and local memory 16 comprises partition decoders 30, 32, 34, and 36, reference memory 38, 40, 42, and 44, and memory manager 46. It is to be understood that the invention is not limited to four partition decoders however. As discussed above, the number of partition decoders corresponds to the number of sections into which the HD picture is divided. In the embodiment of FIG. 3, four decoders are provided to correspond to the four section division of the HD picture depicted in FIG. 2.

Referring to FIG. 3, control information from the decoder configuration unit 14 is used to assign appropriate data to each of the decoders. The local memories 38, 40, 42, and 44, serve the purpose of storing reference sections, as well as routing the coded data to the partition decoders. Memory manager 46 helps to retrieve reference data as well as coded data to the decoders. Memory manager 46 also manages a memory swap required at the conclusion of decoding one picture worth of data, as discussed below.

As mentioned above, each partition decoder in FIG. 3 individually decodes one section of the partitioned HD picture shown in FIG. 2. However, the reference picture memory for each decoder consists of the reference picture decoded, and part of at most two other sections. For example, as broadly depicted in FIG. 3, decoder 32 requires picture section II as well as portions of picture sections I and III. All of the data may be stored in compressed form. Only the region of interest is retrieved and decompressed to provide the reference picture in the pixel domain. Since the reference data required to decode the next picture is spread across the local memory units, this data must be swapped after completely encoding one picture. This memory swap may be performed using block memory transfers, such as Direct Memory Access (DMA).

As a result of the compression, e.g., by a factor of three, the local memory requirement for each decoder is less than one quarter of HD, and is similar to SD. Since each decoder is responsible for decoding only a fraction of the HD picture, the memory bandwidth and speed of the VLD is comparable to SD.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of applicant's general inventive concept.

What is claimed is:

1. A partition decoder system for high definition video decoding, comprising:

a coded data storage unit for receiving a high definition video picture partitioned into a selected number of sections, each section containing a plurality of horizontal rows of macroblocks of data, including coded high definition video data and identification data including a start code;

a fixed length decoder for detecting each said start code and assigning a pointer to each said start code; and a selected number of partition decoders, the selected number of partition decoders corresponding to the selected number of sections, each said partition decoder using one of the pointers to select the high definition video data to be decoded from a selected one of the sections.

2. The system of claim 1, further comprising a host interface for communicating between a host and said partition decoders.

3. The system of claim 2, further comprising a memory manager for providing the coded video data to said partition decoders.

4. The system of claim 2, further comprising means for replacing reference picture data stored in a local memory of the partition decoders by direct memory access after one complete high definition video picture has been decoded.

5. The system of claim 1, further comprising a decoder configuration unit for keeping track of the pointers and passing the pointers to the selected number of partition decoders.

6. The system of claim 1, wherein the selected number of sections is at least two.

7. The system of claim 1, wherein additional data in each said section after the start code further includes sequence data, GOP data, picture data, and slice layer data.

8. The system of claim 1, further comprising a video interface for receiving decoded video data from said partition decoders and outputting it in a selected format.

9. A method of decoding high definition video, comprising the steps of:

receiving a high definition video picture, said high definition video picture being partitioned into a selected number of sections, each section containing a plurality of horizontal rows of macroblocks of data, including coded high definition video data and identification data including a start code;

identifying each start code using a fixed length decoder;

assigning a pointer to each start code; and decoding the high definition video data from the selected number of sections using a corresponding number of partition decoders, each said partition decoder using one of the pointers to select one of said partitioned sections of high definition video data to be decoded.

10. The method of claim 1, wherein additional data in each said section after the start code further includes sequence data, GOP data, picture data, and slice layer data.

11. The method of claim 1, wherein the selected number of sections is at least two.

12. A method of decoding high definition video, comprising the steps of:

receiving a high definition video picture partitioned into at least first, second, third, and fourth sections, each section containing a plurality of horizontal rows of macroblocks of data, including coded high definition video data and identification data including a start code; and decoding the high definition video data using at least first, second, third, and fourth partition decoders, each of said partition decoders being assigned to decode one of said sections, wherein said first partition decoder receives coded video data from said first and second sections, said second partition decoder receives coded video data from said first, second, and third sections, said third partition decoder receives coded video data from said second, third, and fourth sections, and said fourth decoder receives coded video data from said third and fourth sections.

13. The system of claim 5, further comprising a RISC Engine for providing instructions from a data RAM to the partition decoders.

14. A partition decoder system for high definition video decoding, comprising:

means for receiving a high definition video picture partitioned into at least first, second, third, and fourth sections, each section containing a plurality of horizontal rows of macroblocks of data, including coded high definition video data and identification data; and at least first, second, third, and fourth partition decoders, each of said partition decoders being assigned to decode one of said sections, said first partition decoder for receiving coded video data from said first and second sections, said second partition decoder for receiving coded video data from said first, second, and third sections, said third partition decoder for receiving coded video data from said second, third, and fourth sections, and said fourth partition decoder for receiving coded video data from said third and fourth sections.

* * * * *